United States Patent Office

3,366,699
Patented Jan. 30, 1968

---

3,366,699
PREPARATION OF HIGHLY FLUORINATED AROMATIC COMPOUNDS
George Fuller, Avonmouth, England, assignor to Imperial Smelting Corporation (N.S.C.) Limited, London, England, a British company
No Drawing. Filed Jan. 3, 1966, Ser. No. 518,022
Claims priority, application Great Britain, Jan. 4, 1965, 325/65
2 Claims. (Cl. 260—650)

This invention relates to the production of chlorofluorobenzenes, and hydrochlorofluorobenzenes.

Bromo- and iodo-fluorobenzenes can be readily prepared by halogenation of a hydrofluorobenzene using bromine or iodine in oleum. Chlorofluorobenzenes are not accessible by this method. Apparently chlorination is a slower reaction than either bromination or iodination because chlorine shows less tendency to form a cation than do either bromine or iodine, and hence sulphonation is the predominant reaction in this case.

We have now discovered that chlorofluorobenzenes and hydrochlorofluorobenzenes can readily be prepared in good yield by heating the corresponding bromo- or iodo-fluorobenzene with cuprous chloride in an aprotic solvent.

This invention therefore envisages a process for the preparation of chlorofluorobenzenes and hydrochlorofluorobenzenes which comprises heating the corresponding bromo- or iodo-fluorobenzene with cuprous chloride in a polar aprotic solvent. Dimethylformamide is a preferred polar aprotic solvent for use in this reaction, but other such solvents which may be used are dimethyl sulphone, dimethyl sulphoxide and tetrahydrothiophen-1, 1-dioxide, also known as sulpholane.

The boiling point of the solvent generally provides a convenient reaction temperature. Usually, a temperature between 30° C. and 250° C. will be used, and more preferably a temperature of from 100° C. to 150° C.

The chloro-compound, whose boiling point is appreciably lower than that of the solvent is conveniently isolated by fractional distillation from the reaction mixture as it is formed. Alternatively, the reaction mixture may be diluted with water and steam distilled to isolate the product. The process may be advantageously used for the preparation of chloropentafluorobenzene and the di-chlorotetrafluorobenzenes, although it is expected to be of a general nature applicable to all chlorofluorobenzenes.

The mole ratios of cuprous chloride to organic reactant are not critical, and depends upon the extent of the replacement desired, i.e., whether mono-, di- or tri-chloro compounds are being prepared. For the preparation of a mono-chloro compound the ratio is preferably between 1.1 to 1 and 2 to 1.

The invention further provides novel chlorofluorobenzenes, both per se and when they are prepared by the process described above.

The process is mainly applicable to making mono- or di-chloro derivatives, but may also be used to make compounds containing 3 or 4 chlorine atoms per molecule.

Particularly valuable compounds which constitute further aspects of the present invention are 1,2-, 1,3-, and 1,4 - dichlorotetrafluorobenzene, 1 - chloro - 2,3,5,6-tetrafluorobenzene and symmetrical trichlorotrifluorobenzene.

It is surprising that the action of cuprous chloride on these halogenated benzenes results in replacement of bromine or iodine atoms by chlorine atoms since, in general, nucleophiles tend to replace fluorine atoms preferentially over other halogens in such a ring system.

The compounds of the invention are useful as heat- and radiation-stable fluids of low flammability for use, for example, as specialised heat-exchange fluids, coolants and hydraulic fluids where good heat and chemical stability is required.

Thus, they are useful in nuclear reactor installations and other sites where stability to heat and to radiation is at a premium.

An advantage of the process according to the invention over other methods of producing chlorofluorobenzenes (such as the fluorination of $C_6Cl_6$ with KF) is that each of the three isomeric dichlorotetrafluorobenzenes can be prepared from the corresponding dibromo or di-iodo compounds which in turn can be readily prepared by known procedures, from the readily available tetrafluorobenzenes.

The invention will be more fully described by reference to the following examples which are not intended to limit the scope of the process. In these examples, as elsewhere throughout the specification and claims, all temperatures are in degrees centigrade.

*Example 1.—Chloropentafluorobenzene*

Bromopentafluorobenzene (989 g.) was added during 75 minutes to a stirred suspension of cuprous chloride (795 g.) in dimethylformamide (650 cc.) held at 130–140°. The mixture was stirred for 13 hours longer at 130–140° while a liquid distillate (686 g.) B.P. 85–120°, was collected from the top of a 12" vacuum-jacketed column, packed with 1/16" x 1/16" Dixon gauzes, attached to the apparatus. Addition of water (750 cc.) to the residue and steam distillation gave a white solid distillate (54.8 g.). Two recrystallisations of the solid from ethanol gave decafluorobiphenyl (29.8 g.), M.P. 66.5–69.5° (found: C, 43.1; F, 56.3. Calc. for $C_{12}F_{10}$: C, 43.1; F, 56.8%).

An infra-red spectrum had bands at 1647, 1513 cm.$^{-1}$ (fluorinated aromatic ring). The liquid product was washed with 2 N-sulphuric acid, water, and dried ($CaSo_4$). Distillation through a 2' vacuum-jacketed column packed with Dixon gauzes (1/16" x 1/16") gave (i) pentafluorobenzene (100.5 g.), B.P. 85–86°/775 mm., $n_D^{20.5}$ 1.3918 with a correct infra-red spectrum (found: C, 42.6; H, 0.6; F, 55.8. Calc. for $C_6HF_5$: C, 42.9; H, 0.6; F, 56.5%, (ii) intermediate fraction (23.0 g.), B.P. 86–117°, (iii) chloropentafluorobenzene (469 g.), B.P. 117°/750 mm., $n_D^{20.5}$ 1.4244 (found: C, 35.3; Cl, 17.4; F, 46.1. Calc. for $C_6ClF_5$: C, 35.6; Cl, 17.5; 46.9%).

*Example 2.—Chloropentafluorobenzene, prepared with purified reagents*

Bromopentafluorobenzene was washed with 2 N-potassium hydroxide solution, and with water, dried (phosphoric oxide) and distilled (B.P. 136–138°) before use. Cuprous chloride ("Analar") was purified as described by W. C. Fernelius, Inorganic Syntheses 1949, 2, p. 1 and obtained as a white powder. Dimethylformamide was dried (phosphoric oxide) and distilled before use. This reaction was carried out in a nitrogen atmosphere.

Repetition of the previous experiment using bromopentafluorobenzene (575 g.) cuprous chloride (454 g.) and dimethylformamide (450 cc.) gave, in addition to decafluorobiphenyl (54.5 g.) a liquid product which was distilled to give (i) an intermediate fraction (31.0 g.) B.P. 86–116°, consisting of a mixture of pentafluorobenzene (55%) and chloropentafluorobenzene (45%), (ii) chloropentafluorobenzene (302.4 g.), B.P. 116–116.5°, and (iii) a residue (27.0 g.).

*Example 3.—1,4-dichlorotetrafluorobenzene*

A solution of 1,4-dibromotetrafluorobenzene (460 g.) in dimethylformamide (500 cc.) containing a stirred suspension of cuprous chloride (303 g.) was heated to 80°. An exothermic reaction set in, and the mixture was then kept under reflux for 6 hours diluted with water (750 cc.) and steam distilled. Dichloromethane (200 cc.) was added to the distillate and the organic layer separated and dried. Fractional distillation through a 2 ft. vacuum-jacketed column packed with Dixon gauzes (1/16″ x 1/16″) gave, after the removal of solvent, (i) an intermediate fraction (6.2 g.), B.P. 40–125°, (ii) 1-chloro - 2,3,5,6-tetrafluorobenzene (15.1 g.) B.P. 125–126.5°/739 mm., $n_D^{20}$ 1.4423 (found: C, 38.9; H, 0.6; Cl, 19.1; F, 40.6. $C_6HClF_4$ requires C, 39.0; H, 0.5; Cl, 19.2; F, 41.2%). The infra-red spectrum had bands at 3070 cm.$^{-1}$ (C–H stretching), 1639, 1518, 1457 cm.$^{-1}$ (fluorinated aromatic ring), (iii) an intermediate fraction (43.5 g.), B.P. 126.5–157°, (iv) 1,4 - dichlorotetrafluorobenzene (99.1 g.), B.P. 157–158°/759 mm., M.P. 52–54° (after two re-crystallisations from ethanol) (found: C, 32.5; Cl, 32.0; F, 34.7. $C_6Cl_2F_4$ requires C, 32.9; Cl, 32.4; F, 34.7%). The infra-red spectrum ($CCl_4$ solution) had bands at 1496, 1460 cm.$^{-1}$ (carbon-carbon stretching in a fluorinated aromatic ring), (v) an intermediate fraction (14.1 g.) B.P. 158–160°, and (vi) a residual solid (76.1 g.).

By vapour-phase reduction at 280° with hydrogen over a 10% palladium an active carbon catalyst, 1,4-dichlorotetrafluorobenzene (10.9 g.) gave a liquid product (5.5 g.) which was dried over phosphoric oxide and distilled to give (i) a liquid (2.6 g.) B.P. 94–108°, consisting of a mixture of 1,2,4,5 - tetrafluorobenzene (76%) and 1-chloro - 2,3,5,6 - tetrafluorobenzene (24%) identified by gas chromatography and infra-red spectroscopy, and (ii) a liquid residue (2.5 g.) containing a mixture of 1,2,4,5- tetrafluorobenzene (24%) 1 - chloro - 2,3,5,6 - tetrafluorobenzene (72%), and 1,4 - dichlorotetrafluorobenzene (4%).

*Example 4.—1,2-dichlorotetrafluorobenzene*

1,2 - dibromotetrafluorobenzene (154 g.) was added during 15 minutes to a stirred suspension of cuprous chloride (200 g.) in dry, freshly-distilled dimethylformamide (250 cc.) at about 100°. The mixture was heated under reflux for 4½ hours, then 300 cc. of water was added and the organic product (92 g.) isolated by steam distillation. This product was washed with 2 N-sulphuric acid and 60.5 g. of it was fractionally distilled using a 1-ft. column packed with 1/16″ x 1/16″ Dixon gauzes to give 1,2 - dichlorotetrafluorobenzene (32.5 g.), B.P. 156–157.5°/760 mm. (found: C, 32.9. $C_6Cl_2F_4$ requires C, 32.9%).

The compounds of the invention have shown a positive result in a test for analgesic and anti-inflammatory properties, and are therefore useful as analgesics and/or anti-inflammatory compounds.

The compounds were tested for analgesic and anti-inflammatory activity by means of an "anti-writhing" test. This is described by Siegmund, Cadmus and Lu (Proc. Soc. Expt. Bio. Med. 1957, 95 729).

Results obtained are shown in the following table:

TABLE

| Compound | M.P. (° C.) | B.P. (° C.) | Analgesic Activity in anti-writhing test | |
|---|---|---|---|---|
| | | | No. protected/No. dosed | Dose level |
| 1,4-dichlorotetrafluorobenzene | 52–54 | 157–168 | 3/10 | 128 |
| 1,2-dichlorotetrafluorobenzene | | 156–157 | 10/10 | 256 |
| Sym. trichlorotrifluorobenzene | 63 | | 1/10 | 256 |
| Chloro-2,3,5,6-tetrafluorobenzene | | 126 | 6/10 | 128 |

I claim:
1. A process for the preparation of chlorofluorobenzenes and hydrochlorofluorobenzenes comprising heating at a temperature between 30° C. and 250° C. the corresponding compound selected from the group consisting of bromofluorobenzenes and iodofluorobenzenes with cuprous chloride in a polar aprotic solvent selected from the group consisting of dimethyl formamide, dimethyl sulphone, dimethyl sulphoxide and sulpholane.

2. A process for the preparation of chlorofluorobenzenes and hydrochlorofluorobenzenes which comprises heating at a temperature between 30° C. and 250° C. the corresponding compound selected from the group consisting of bromofluorobenzenes and iodofluorobenzenes with cuprous chloride in dimethylformamide.

References Cited

UNITED STATES PATENTS

| 2,586,364 | 2/1952 | McBee et al. | 260—650 |
| 2,967,894 | 1/1961 | Pummer et al. | 260—650 |
| 3,277,192 | 10/1966 | Fielding | 260—650 |
| 3,300,537 | 1/1967 | Bennett et al. | 260—650 |

OTHER REFERENCES

Finger et al.: Abstracts, Organic Division, XVI International Congress of Pure and Applied Chemistry, Paris, July 1957.

Chambers et al.: Tetrahedron, vol. 19 (1963), p. 900.

Parshall, J. Org. Chem., vol. 27 (1962), pp. 4649–4650.

LEON ZITVER, *Primary Examiner.*

H. MARS, N. J. KING, *Assistant Examiners.*

UNITED STATES PATENT OFFICE
CERTIFICATE OF CORRECTION

Patent No. 3,366,699                      January 30, 1968

George Fuller

It is hereby certified that error appears in the above numbered patent requiring correction and that the said Letters Patent should read as corrected below.

Column 2, line 25, for "(686 g.)" read -- (686 g.), --; line 43, for "(469 g.)" read -- (496 g.) --; line 53, for "1949,2" read -- 1946,2 --.

Signed and sealed this 22nd day of April 1969.

(SEAL)
Attest:

Edward M. Fletcher, Jr.                        EDWARD J. BRENNER
Attesting Officer                              Commissioner of Patents